(12) United States Patent
Nobutaka et al.

(10) Patent No.: US 7,514,956 B2
(45) Date of Patent: Apr. 7, 2009

(54) SEMICONDUCTOR DEVICE (75) Inventors: Yasushi Nobutaka, Osaka (JP); Hiroshi Kamiya, Osaka (JP); Kunio Ohno, Osaka (JP)

(73) Assignee: NEC System Technologies, Ltd., Osaka (JP)

( * ) Notice: Subject to any disclaimer, the term of this patent is extended or adjusted under 35 U.S.C. 154(b) by 50 days.

(21) Appl. No.: 11/699,358

(22) Filed: Jan. 30, 2007

(65) Prior Publication Data

US 2007/0198821 A1    Aug. 23, 2007

(30) Foreign Application Priority Data

Jan. 31, 2006    (JP)    ............... 2006-022240

(51) Int. Cl.
*H03K 17/16*    (2006.01)
(52) U.S. Cl. ............... 326/33; 361/90; 363/78
(58) Field of Classification Search ............... 326/21, 326/30; 363/24, 124
See application file for complete search history.

(56) References Cited

U.S. PATENT DOCUMENTS

| | | | |
|---|---|---|---|
| 6,175,484 B1 * | 1/2001 | Caruthers et al. | ........... 361/159 |
| 6,195,273 B1 * | 2/2001 | Shteynberg | ................. 363/26 |
| 2004/0076023 A1 * | 4/2004 | Mizokami et al. | ............. 363/24 |
| 2006/0226867 A1 * | 10/2006 | Goh | .......................... 326/30 |

FOREIGN PATENT DOCUMENTS

| | | |
|---|---|---|
| JP | 04-033520 | 2/1992 |
| JP | 05-095273 | 4/1993 |
| JP | 05-243938 | 9/1993 |
| JP | 07-095766 | 4/1995 |
| JP | 8-149831 | 6/1996 |
| JP | 09-275336 | 10/1997 |
| JP | 10-145207 | 5/1998 |
| JP | 2000-252807 | 9/2000 |

* cited by examiner

*Primary Examiner*—Rexford Barnie
*Assistant Examiner*—Jany Tran
(74) *Attorney, Agent, or Firm*—Young & Thompson (57) ABSTRACT

A first and a second charging circuit each having a diode and a capacitor are connected to a buffer. In the first charging circuit, an overshoot based on a reflected signal generated by an output signal is stored as an electric charge to the capacitor, and in the second charging circuit, an undershoot based on a reflected signal generated by an input signal is charged as an electric charge to the capacitor, whereby the energy of the overshoot and the like is recovered. These charges are collected in the charging circuit, stored in the capacitor, converted into a power supply voltage of an internal power supply by a stabilization circuit, and are supplied as an internal power supply. The reflected energy of the signal generated during signal transmission at the time of data transfer between semiconductor devices is stored, and the stored energy is used in driving the signals.

16 Claims, 6 Drawing Sheets

SEMICONDUCTOR DEVICE

BACKGROUND OF THE INVENTION

1. Field of the Invention

The present invention relates to a semiconductor device in which electric power can be efficiently used by storing the reflected energy generated during signal exchange and recovering the stored energy into power supply voltage.

2. Description of the Related Art

The frequency of signals handled by semiconductors increases every year in conjunction with the current development of digital technologies, and semiconductor devices for transferring data between semiconductor devices have been implemented by using interfaces having frequencies in excess of 1000 MHz. As the frequency of interface signals becomes higher, an increase in the speed of the rise and fall when these signals are driven is required. However, reducing the rise time and fall time of the signals tends to produce overshooting in which the signal waveform temporarily exceeds the stipulated level because of mismatching of the characteristic impedance of the transmission path, and undershooting in which the signal waveform temporarily falls below the stipulated level. Overshooting and undershooting are accompanied by relatively large currents, but are completely unnecessary for signal propagation, and merely increase the power consumption.

Figure 1:
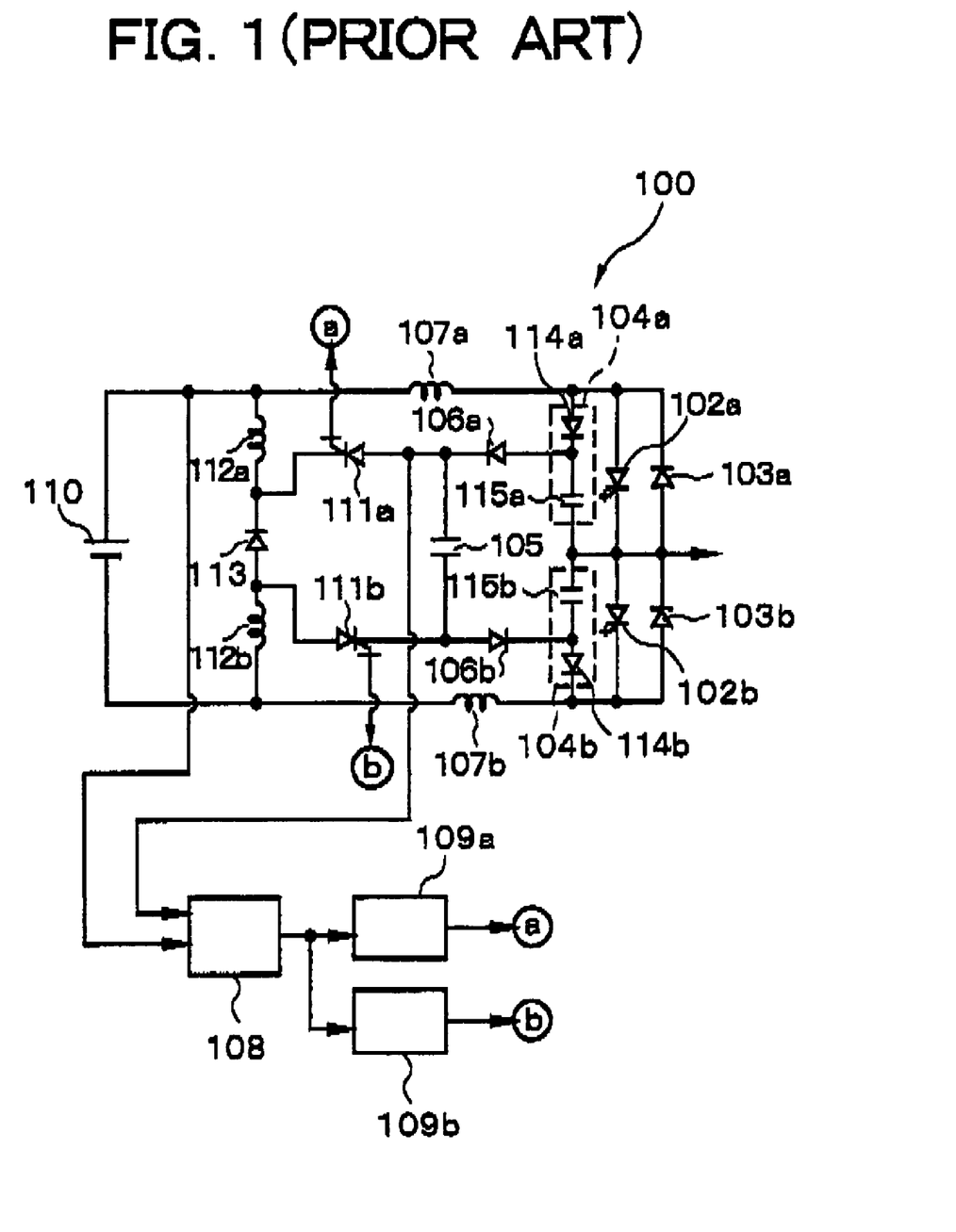
FIG. 1 is a circuit diagram showing the structure of the voltage inverter described in Japanese Laid-open Patent Application No. 8-149831.

The technique disclosed in Japanese Laid-open Patent Application No. 8-149831 is known as a technique that allows the excess voltage energy accompanying the switching operation of a power device to be efficiently recovered on the power supply side. FIG. 1 is a circuit diagram showing the construction of the voltage inverter described in this Japanese Laid-open Patent Application No. 8-149831.

As is shown in FIG. 1, circular-flow diodes 103a and 103b and snubber circuits 104a and 104b are connected in-parallel to GTOs (gate turn-off thyristors) 102a and 102b, respectively. The snubber circuit 104a comprises a diode 114a and a capacitor 115a, and the snubber circuit 104b comprises a diode 114b and a capacitor 115b. Furthermore, a capacitor (energy recovery capacitor) 105 is connected in parallel with the capacitors 115a and 115b via respective diodes 106a and 106b. Moreover, the GTOs 102a and 102b are connected to a direct-current power supply 110 via respective reactors 107a and 107b.

The steep voltage rise occurring when the GTOs 102a and 102b are off is suppressed by the snubber circuits 104a and 104b; furthermore, the abrupt current variation occurring when the GTOs 102a and 102b are on is suppressed by the reactors 107a and 107b. Moreover, the absorbed energy that charges the respective capacitors 115a and 115b inside the snubber circuits 104a and 104b charges the capacitor 105 via the diodes 106a and 106b in accordance with the switching operation of the GTOs 102a and 102b accompanying the rise in the charging voltage. Furthermore, the capacitor 105 is charged with the absorbed energy of the reactors 107a and 107b via the diodes 106a and 106b when the GTOs 102a and 102b are off.

The voltage inverter 100 is also provided with a voltage comparator circuit 108 for detecting the charging voltage of the capacitor 105; GTOs 111a and 11b, which are switching elements that switch the connection between the capacitor 105 and the direct-current power supply 110 on and off; and ignition circuits 109a and 109b that control this switching operation. When the charging voltage of the capacitor 105 exceeds the power supply voltage, the capacitor 105 and direct-current power supply 110 are connected by switching the switching elements on, and the charged energy of the capacitor 105 is recovered on the power supply side via the reactors 112a and 112b and the diode 113. Furthermore, in FIG. 1, the power supply voltage is used as the comparative voltage of the voltage comparator circuit 108; however, an embodiment that allows comparison with a specified reference voltage is described in Japanese Laid-open Patent Application No. 8-149831.

However, the prior art described in Japanese Laid-open Patent Application No. 8-149831 suffers from the following problems.

In signal transmission via a driver and receiver in a conventional electronic circuit, an increase in the frequency results in an increase in the amount of current that is supplied to the LSI (large scale integrated circuits), so that the consumption of power and generation of heat are increased. Furthermore, such an increase in the amount of heat generated makes it necessary to increase the performance of the cooling system, so that an increase in the size of the heat sink and an increase in the speed of the cooling fan become necessary, resulting in the problem of a deleterious effect on the environment. These problems run counter to the current movement of easing the environmental problems.

As was described above, when the rise time and fall time during the driving of signals in data transfer between semiconductor devices are shortened, overshooting and undershooting, which constitute noise components, are generated as a result of the mismatching of the characteristic impedance of the transmission path, so that the power consumption is increased. Accordingly, if feedback means for reutilizing power arising from overshooting and undershooting can be provided, this will lead to the efficient utilization of power, and the noise component caused by reflection can be reduced.

In the past, energy recovery circuits using snubber circuits have been known, as described in Japanese Laid-open Patent Application No. 8-149831. However, such techniques fail to suppress the overshooting and undershooting generated during high-frequency signal transmission between semiconductor devices, or to reduce power consumption by reutilizing reflected energy.

SUMMARY OF THE INVENTION

An object of the present invention is to provide a semiconductor device in which reflection-induced noise can be reduced and electric power can be efficiently used by storing the reflected energy generated during signal transmission in the exchange of data between semiconductor devices, and using the stored energy during driving of the signals.

The semiconductor device according to the present invention comprises an energy recovery part wherein an overshoot and undershoot during an input or output of a signal in an input buffer or output buffer are recovered as energy, a charging part for charging the recovered energy, and a supply part for supplying an electric charge charged in the charging part as power supply voltage.

The semiconductor device according to the present invention comprises an output terminal, an output buffer for outputting a signal via the output terminal, a power supply for supplying a voltage to, and operating, an electronic circuit that includes the output buffer, a first circuit which is connected to the output buffer and in which an overshoot whose output voltage exceeds the power supply voltage during the transition of the output signal level is recovered as energy and charged, a second circuit which is connected to the output buffer and in which an undershoot whose output voltage falls below the ground voltage during the transition of the output signal level is recovered as energy and charged, a charging circuit which is connected to the first or second circuit and which collects the charge charged by the first or second circuit, a switch for switching the connection between the first and second circuit and the charging circuit, a capacitor which is connected to the charging circuit and which stores the charge collected by the charging circuit, and a supply circuit which is connected to the abovementioned capacitor and which converts the charge stored in this capacitor into a power supply voltage of an internal power supply, and supplies this voltage as an internal power supply.

The semiconductor device according to the present invention comprises an input terminal, an input buffer for inputting a signal via the input terminal, a power supply for supplying a voltage to, and operating, an electronic circuit that includes the input buffer, a first circuit which is connected to the input buffer and in which an overshoot whose input voltage exceeds the power supply voltage during the transition of the input signal level is recovered as energy and charged, a second circuit which is connected to the input buffer and in which an undershoot whose input voltage falls below the ground voltage during the transition of the input signal level is recovered as energy and charged, a charging circuit which is connected to the first or second circuit and which collects the charge charged by the first or second circuit, a switch for switching the connection between the first and second circuit and the charging circuit, a capacitor which is connected to the charging circuit and which stores the charge collected by the charging circuit, and a supply circuit which is connected to the abovementioned capacitor and which converts the charge stored in this capacitor into a power supply voltage of an internal power supply, and supplies this voltage as an internal power supply.

The switch may comprise a field effect transistor.

The semiconductor device according to the present invention comprises an output terminal; an output buffer for outputting a signal via the output terminal; a power supply for supplying a voltage to, and operating, an electronic circuit that includes the output buffer; a first circuit which is connected to the output buffer and in which an overshoot whose output voltage exceeds the power supply voltage during the transition of the output signal level is recovered as energy and charged; a second circuit which is connected to the output buffer and in which an undershoot whose output voltage falls below the ground voltage during the transition of the output signal level is recovered as energy and charged; charging circuits which are separately connected to the first and second circuits, and which collect the charge charged by the first and second circuits; capacitors which are connected in a corresponding manner to the charging circuits and which store the charge collected by the charging circuits; and supply circuits which are separately connected to the capacitors and which convert the charge stored in the capacitors into a power supply voltage of an internal power supply, and supply the voltage as an internal power supply.

The semiconductor device according to the present invention comprises an input terminal; an input buffer for inputting a signal via the input terminal; a power supply for supplying a voltage to, and operating, an electronic circuit that includes the input buffer; a first circuit which is connected to the input buffer and in which an overshoot whose input voltage exceeds the power supply voltage during the transition of the input signal level is recovered as energy and charged; a second circuit which is connected to the input buffer and in which an undershoot whose input voltage falls below the ground voltage during the transition of the input signal level is recovered as energy and charged; charging circuits which are separately connected to the first and second circuits, and which collect the charge charged by the first and second circuits; capacitors which are connected in a corresponding manner to the charging circuits and which store the charge collected by the charging circuits; and supply circuits which are separately connected to the capacitors and which convert the charge stored in the capacitors into a power supply voltage of an internal power supply, and supply the voltage as an internal power supply.

The first and second circuits can be configured so that snubber circuits constructed by connecting a diode and a capacitor in series are included.

A configuration can be adopted in which the first circuit has a first diode whose cathode side is connected to the input or output buffer and whose anode side is connected to the power supply, a second diode which is connected to the connection point between the first diode and the input or output buffer and whose anode side is connected to this connection point, a first capacitor which is connected to the second diode, and a first switch for switching the first capacitor to the ground point or the connection point between the power supply and the first diode; the connection point between the second diode and the first capacitor is connected to the charging circuit via the switch; the second circuit has a third diode whose anode side is connected to the input or output buffer and whose cathode side is connected to the ground point, a fourth diode which is connected to the connection point between the third diode and the ground point and whose anode side is connected to this connection point, a second capacitor which is connected to the fourth diode, and a second switch for switching the second capacitor to the ground point or the connection point between the input or output buffer and the third diode; and the connection point between the fourth diode and the second capacitor is connected to the charging circuit via the switch.

The first and second switches may comprise field effect transistors.

A configuration may be adopted in which the first circuit has a first diode whose cathode side is connected to the input or output buffer and whose anode side is connected to the power supply, a second diode which is connected to the connection point between the first diode and the input or output buffer and whose anode side is connected to this connection point, and a first capacitor one end of which is connected to the second diode and the other end of which is grounded; the connection point between the second diode and the first capacitor is connected to the charging circuit; the second circuit has a third diode whose anode side is connected to the input or output buffer and whose cathode side is connected to the ground point, a fourth diode which is connected to the connection point between the third diode and the ground point and whose anode side is connected to this connection point, and a second capacitor one end of which is connected to the fourth diode and the other end of which is grounded; and the connection point between the fourth diode and the second capacitor is connected to the charging circuit.

In the present invention, the reflected energy of the signals generated in cases where electrical signals are transmitted to signal lines in electronic circuits is stored, and the stored energy is used when the drivers drive the signal lines, so that the noise generated by reflection is reduced, and the energy can be effectively utilized, thus reducing the amount of power consumption.

DESCRIPTION OF THE PREFERRED EMBODIMENTS

Figure 2:
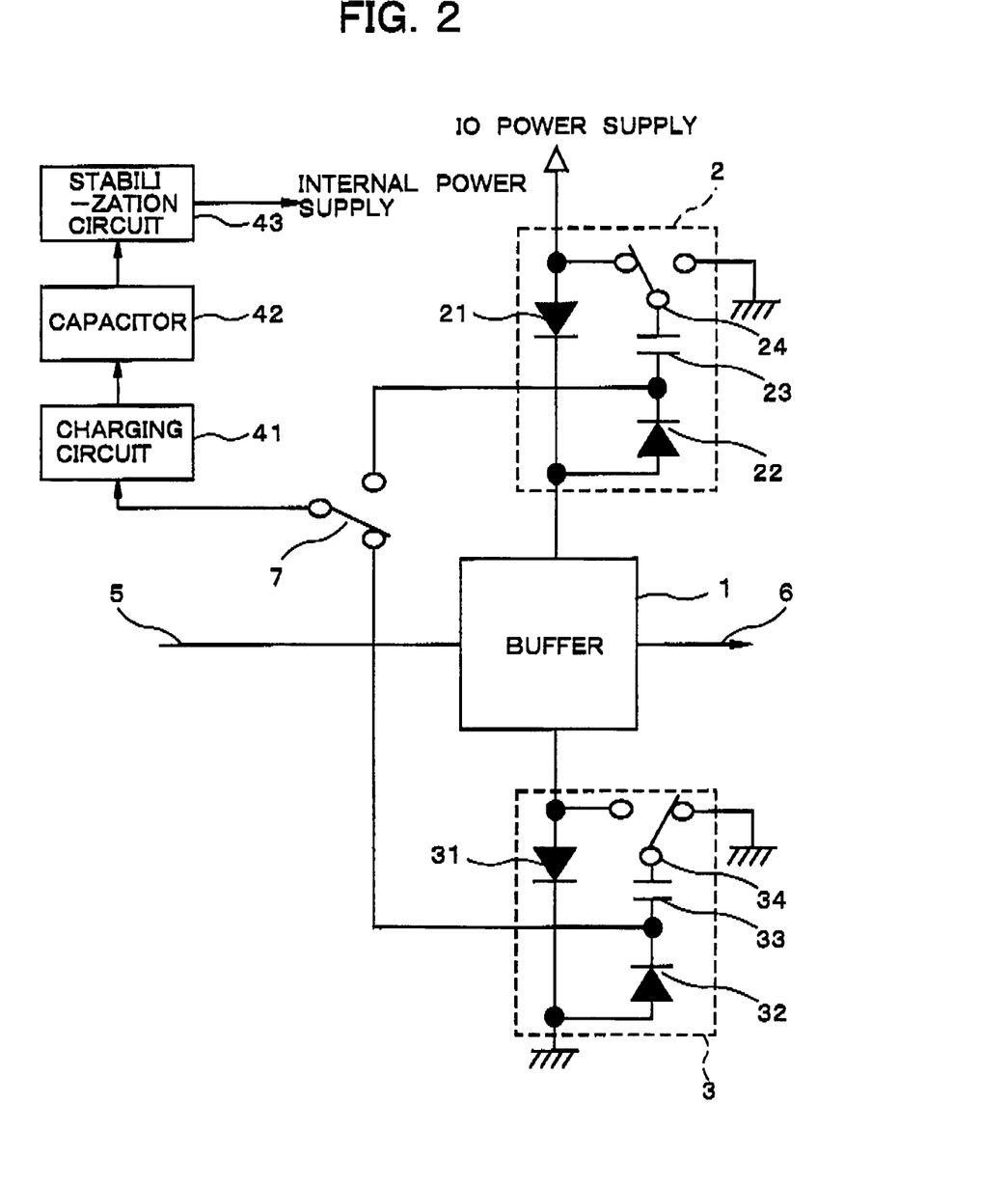
FIG. 2 is a circuit diagram showing the structure of a semiconductor device according to a first embodiment of the present invention.
Figure 3:
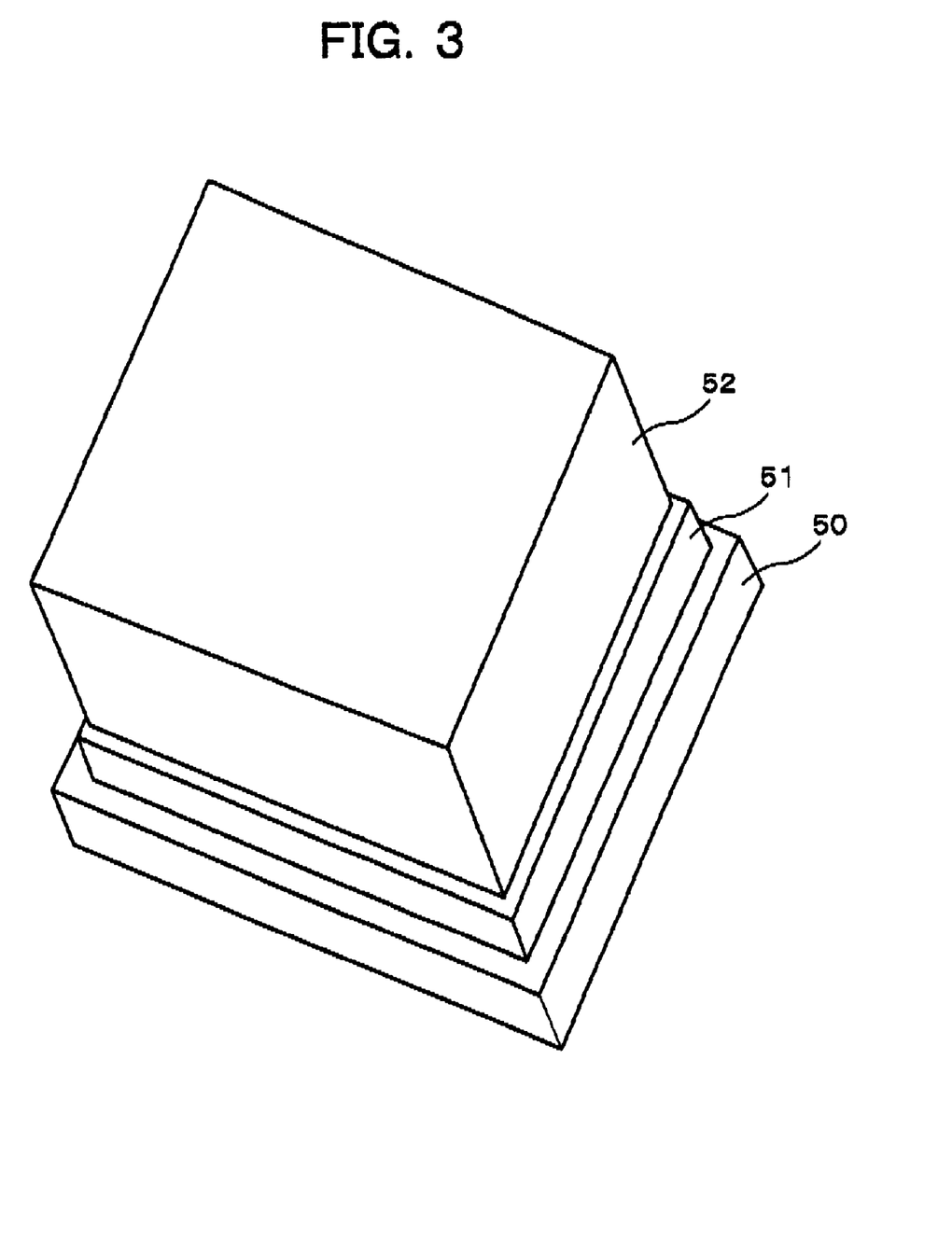
FIG. 3 is a perspective view showing the external appearance of a semiconductor device according to a first embodiment of the present invention.

Embodiments of the present invention will now be described in specific terms with reference to the accompanying drawings. First, a first embodiment of the present invention will be described. FIG. 2 is a circuit diagram showing the structure of a semiconductor device according to a first embodiment of the present invention. Furthermore, FIG. 3 is a perspective view showing the external appearance of the semiconductor device of this embodiment.

As is shown in FIG. 2, the semiconductor device of the present embodiment comprises a buffer 1 that constitutes the final stage of an output buffer. The buffer 1 outputs an output signal 6 corresponding to an input signal 5. When the input level varies from a high level to a low level, the output level varies from a low level to a high level. Conversely, when the input level varies from a low level to a high level, the output level varies from a high level to a low level.

The buffer 1 is connected to a charging circuit 2 comprising a diode 21, a diode 22, a capacitor 23, and a switch 24. The buffer 1 is connected to an IO power supply via the diode 21, and the anode side of the diode 21 is the power supply side. Furthermore, the connection point between the diode 21 and the buffer 1 is connected to the diode 22, the diode 22 is connected to the capacitor 23, and the capacitor 23 is connected to the switch 24. Moreover, the cathode side of the diode 22 is the side of the capacitor 23. Furthermore, by switching the connection of the switch 24, the capacitor 23 is either connected to the connection point between the IO power supply and the diode 21, or grounded.

Furthermore, the buffer 1 is connected to a charging circuit 3 comprising a diode 31, a diode 32, a capacitor 33, and a switch 34. The buffer 1 is grounded via the diode 31, and the cathode side of the diode 31 is the ground side. Furthermore, the connection point between the diode 31 and the ground point is connected to the diode 32, the diode 32 is connected to the capacitor 33, and the capacitor 33 is connected to the switch 34. Moreover, the cathode side of the diode 32 is the side of the capacitor 33. Furthermore, by switching the connection of the switch 34, the capacitor 33 is either connected to the connection point between the buffer 1 and diode 31, or grounded.

The connection point between the diode 22 and capacitor 23, and the connection point between the diode 32 and capacitor 33 are both connected to a charging circuit 41 via the switching of a switch 7. Furthermore, the charging circuit 41 collects the charge that is temporarily stored in the capacitor 23 or 33. Moreover, the charging circuit 41 is connected to a capacitor 42, and the charge collected by the charging circuit 41 is stored in the capacitor 42. Furthermore, in order to convert the charge stored in the capacitor 42 to the power supply level of the internal power supply, the capacitor 42 is connected to a stabilization circuit 43. For example, the switches 24, 34 and 7 are constructed from FETs (field effect transistors), and are switched according to the output level or input level.

Next, the operation of the present embodiment will be described. First, as is shown in FIG. 2, the switch 24 is connected to the IO power supply and the anode side of the diode 21, the switch 34 is connected to the GND (ground) side, and the switch 7 is connected to the charging circuit 3.

When the input signal 5 varies from a high level to a low level, the buffer 1 performs the opposite action from the input level; accordingly, the output level varies from a low level to a high level. The output side of the buffer 1 is generally connected to a receiver, so that a reflected wave returns as a result of mismatching of the characteristic impedance; this reflected wave may exceed the power supply voltage of the buffer 1. In the present invention, the voltage is recovered in cases where the voltage of the output signal 6 exceeds the power supply voltage of the buffer 1 as a result of reflection. Specifically, when the voltage of the signal appearing at the output exceeds the power supply voltage, a current flows through the diode 22, so that a charge is accumulated in the capacitor 23.

Next, when the input signal 5 varies from a low level to a high level, the buffer 1 performs the opposite action from the input level, so that the output level varies from a high level to a low level. In this case, the switch 24 is connected to the GND side, the switch 34 is connected to the buffer 1 and the anode side of the diode 31, and the switch 7 is connected to the charging circuit 2. When the output level varies from a high level to a low level, there may be cases in which a voltage equal to or less than the GND level is generated in the output level as a result of reflection. When the voltage of the signal appearing at the output falls to or below the GND level, a current flows through the diode 32, so that a charge is accumulated in the capacitor 33. Meanwhile, the charge stored in the capacitor 33 moves to the charging circuit 41 via the switch 7.

Furthermore, when the input voltage of the input signal 5 again varies from a high level to a low level, the level of the output signal 6 varies from a low level to a high level. In this case, the switch 24 is connected to the power supply and the anode side of the diode 21, the switch 34 is connected to the GND side, and the switch 7 is connected to the charging circuit 3. As a result, the charge stored in the capacitor 33 moves to the charging circuit 41 via the switch 7.

Thus, as a result of the charges generated by reflection being collected in the capacitors 23 and 33, there is no subsequent reflection by the buffer 1.

The capacitor 42 is charged with the charges collected in the charging circuit 41. The charge stored in the capacitor 42 is supplied as an internal power supply after the voltage is converted to the power supply voltage of this internal power supply by the stabilization circuit 43.

Next, the external appearance of the present embodiment will be described with reference to FIG. 3. In FIG. 3, a capacitor 51 is disposed on an interposer 50 that accommodates the semiconductor, and a heat sink 52 is disposed on top of this. Heat generated in the interior of the device is transmitted to the interposer 50. The heat is further transmitted to the heat sink 52 via the capacitor 51, and is dissipated into the atmosphere. The capacitor 51 includes the capacitor 42 shown in FIG. 2. This capacitor stores the charge collected by the charging circuit 41 and supplies power to the stabilization circuit 43.

Next, the effect of the present embodiment will be described.

The first effect is that the power consumption of a system using the semiconductor device according to the present invention can be reduced by making it possible to reutilize the power of noise components such as overshooting, undershooting, and the like generated by reflection during signal transfer.

The second effect is that noise generated by reflection can be reduced by absorbing the power of overshooting and undershooting.

The third effect is that the signal level can be stabilized by reducing noise, so that the possibility of being able to utilize much higher frequencies is increased. Furthermore, this means that operation at such frequencies can be stabilized.

The fourth effect is that the return of current generated by overshooting and undershooting to the power supply can be eliminated, so that the level of electromagnetic field emissions from the power supply lines can be lowered.

Figure 4:
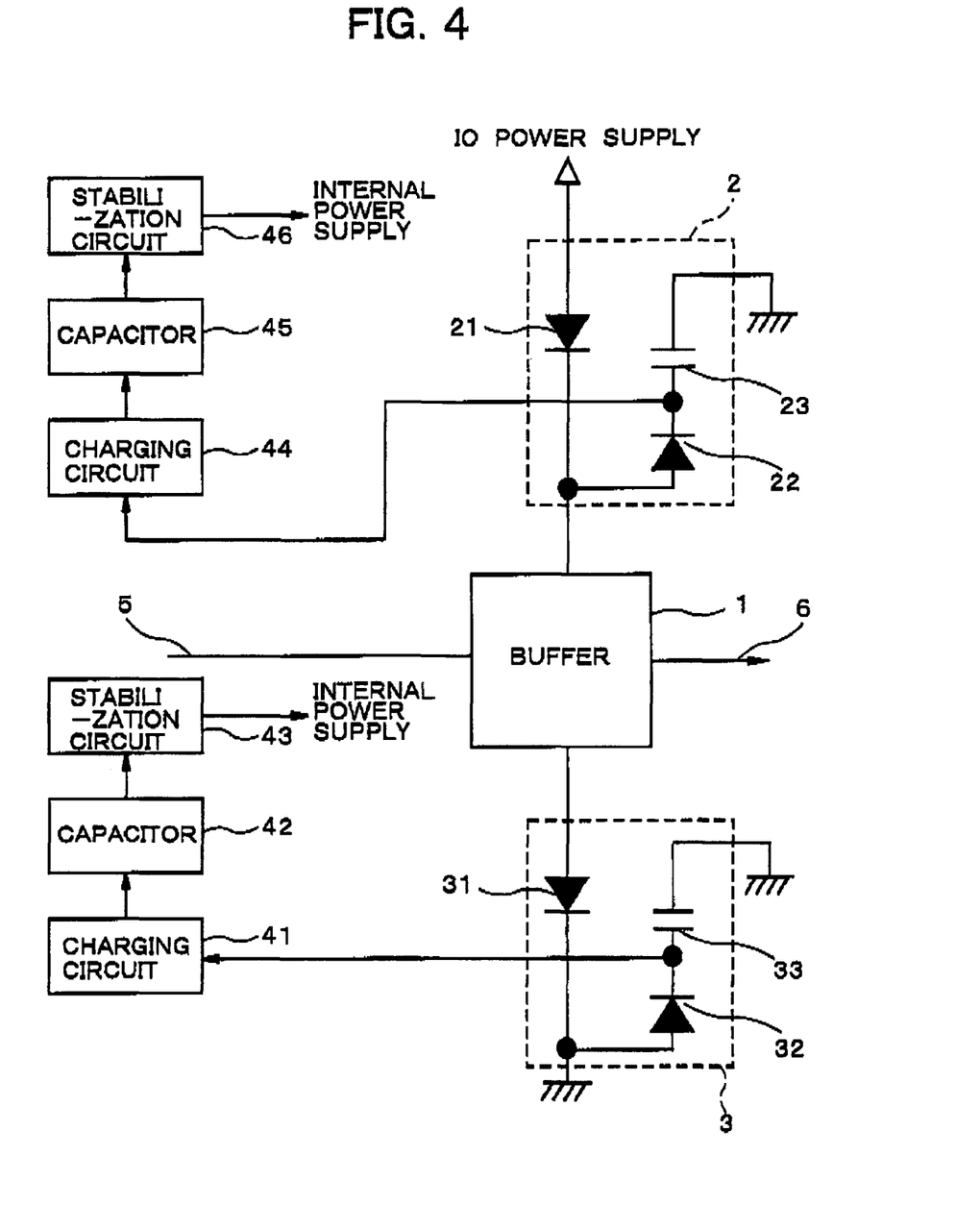
FIG. 4 is a circuit diagram showing the structure of a semiconductor device according to a second embodiment of the present invention.

Next, a second embodiment of the present invention will be described. FIG. 4 is a circuit diagram showing the structure of a semiconductor device according to a second embodiment of the present invention.

In FIG. 4, a charging circuit 44, a capacitor 45 and a stabilization circuit 46 are provided in the structure shown in FIG. 2. Meanwhile, the switches 24, 34, and 7 are not installed, the capacitors 23 and 33 are grounded to GND, and the charging circuits 2 and 3 are respectively connected to the charging circuits 44 and 41. The remaining structure is the same as in FIG. 2. Accordingly, constituent elements that are the same as in FIG. 2 are labeled with the same symbols, and a detailed description of these elements is omitted.

Next, the operation of this embodiment will be described. The buffer 1 drives an output signal 6 in accordance with the level of the input signal 5. When the input signal 5 varies from a high level to a low level, the buffer 1 performs the opposite action from the input level; accordingly, the output level varies from a low level to a high level. The output signal 6 output from the buffer 1 is generally connected to a receiver, so that a reflected wave returns as a result of mismatching of the characteristic impedance. Furthermore, the reflected wave may exceed the power supply voltage of the buffer 1. In the present invention, in cases where the voltage of the output signal 6 exceeds the power supply voltage of the buffer 1 as a result of reflection, this is recovered as a charge. Specifically, when the voltage of a signal appearing at the output exceeds the power supply voltage, a current flows through the diode 22, so that the capacitor 23 is charged. The charge collected by the capacitor 23 is stored in the capacitor 45 by the charging circuit 44. The charge stored in the capacitor 45 is converted to the power supply voltage of an internal power supply by the stabilization circuit 46, and is supplied as an internal power supply.

Next, when the input signal 5 varies from a low level to a high level, the output signal 6 varies from a high level to a low level. When the output signal 6 varies from a high level to a low level, a voltage equal to or less than the GND level is generated by reflection at the output pin. When the output falls to or below the GND level, a current flows through the diode 32, so that the capacitor 33 is charged. The charge with which the capacitor 33 is charged is caused to charge the capacitor 42 by the charging circuit 41. The charge with which the capacitor 42 is charged is supplied as an internal power supply after the voltage is converted to the power supply voltage of this internal power supply by the stabilization circuit 43.

Thus, the charge generated by reflection is collected in the capacitors 23 and 33, so that there is no subsequent reflection by the buffer 1.

Furthermore, the effects of this embodiment are the same as those of the first embodiment.

Figure 5:
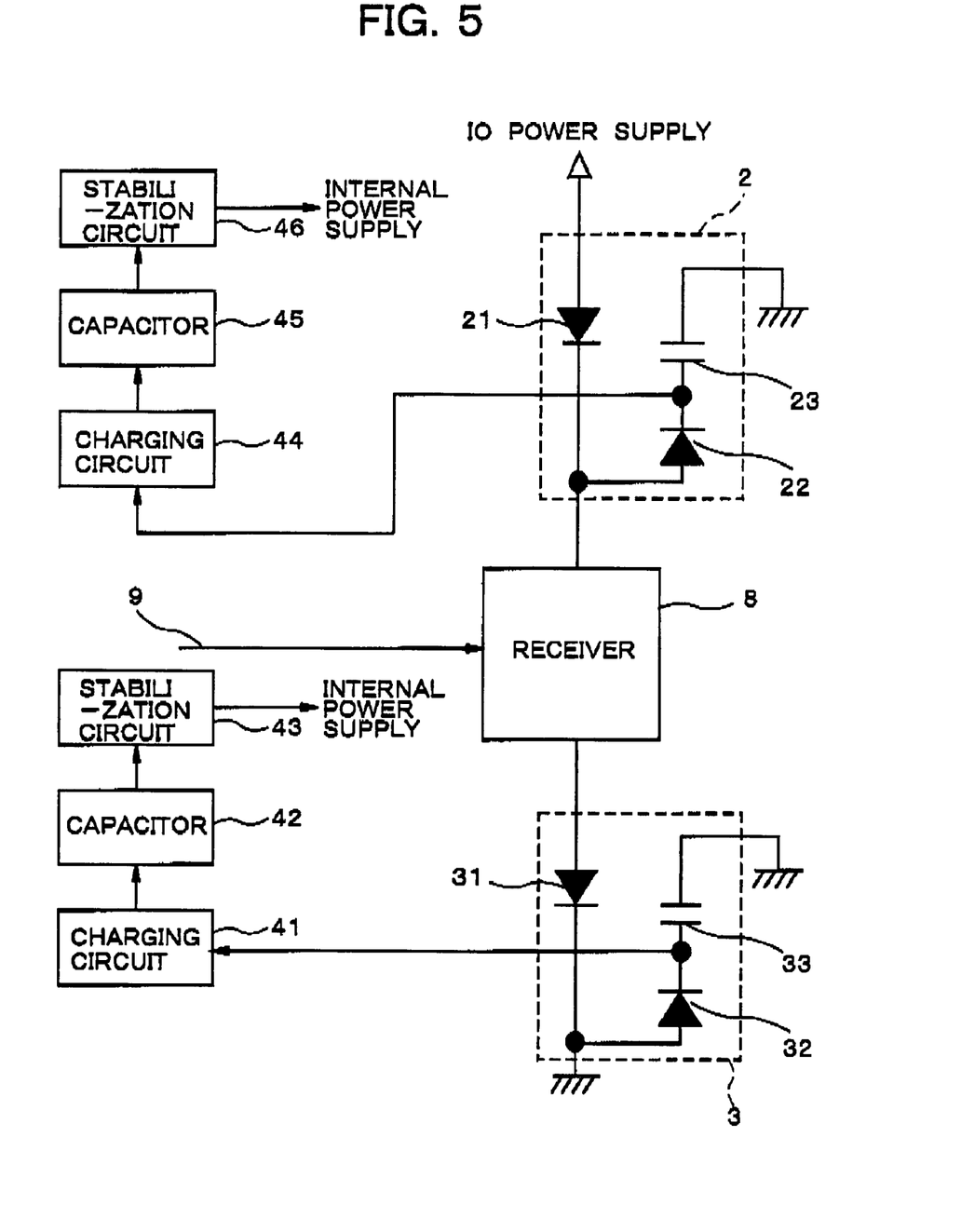
FIG. 5 is a circuit diagram showing the structure of a semiconductor device according to a third embodiment of the present invention.

Next, a third embodiment of the present invention will be described. FIG. 5 is a circuit diagram showing the structure of a semiconductor device according to a third embodiment of the present invention. In FIG. 5, the buffer 1, which is the driver in FIG. 4, is replaced by a receiver 8, and an input signal 9 is input into the receiver 8. The remaining structure is the same as in FIG. 4. Accordingly, constituent elements that are the same as in FIG. 4 are labeled with the same symbols, and a detailed description of these elements is omitted.

Next, the operation of this embodiment will be described. The operation of the present embodiment is similar to the operation of the second embodiment. The current caused by a voltage exceeding the power supply voltage, and the current caused by a voltage equal to or less than the GND level due to overshooting and undershooting are collected and used as an internal power supply.

Specifically, when the voltage of the signal input into the receiver 8 exceeds the power supply voltage, electric current flows through the diode 22, and the current is accumulated in the capacitor 23. The charge collected by the capacitor 23 is stored in the capacitor 45 by the charging circuit 44. Furthermore, the charge stored in the capacitor 45 is supplied as an internal power supply after the voltage is converted into the power supply voltage of this internal power supply by the stabilization circuit 46. On the other hand, when the voltage of the input signal 9 falls to or below the GND level, an electric current flows through the diode 32, and is stored in the capacitor 33. The charge collected by the capacitor 33 is stored in the capacitor 42 by the charging circuit 41. Furthermore, the charge stored in the capacitor 42 is supplied as an internal power supply after the voltage is converted to the power supply voltage of this internal power supply by the stabilization circuit 43.

Thus, reflection is reduced as a result of the charges generated by overshooting and undershooting being collected in the capacitors 23 and 33. Furthermore, the effects of the present embodiment are the same as those of the first embodiment.

Figure 6:
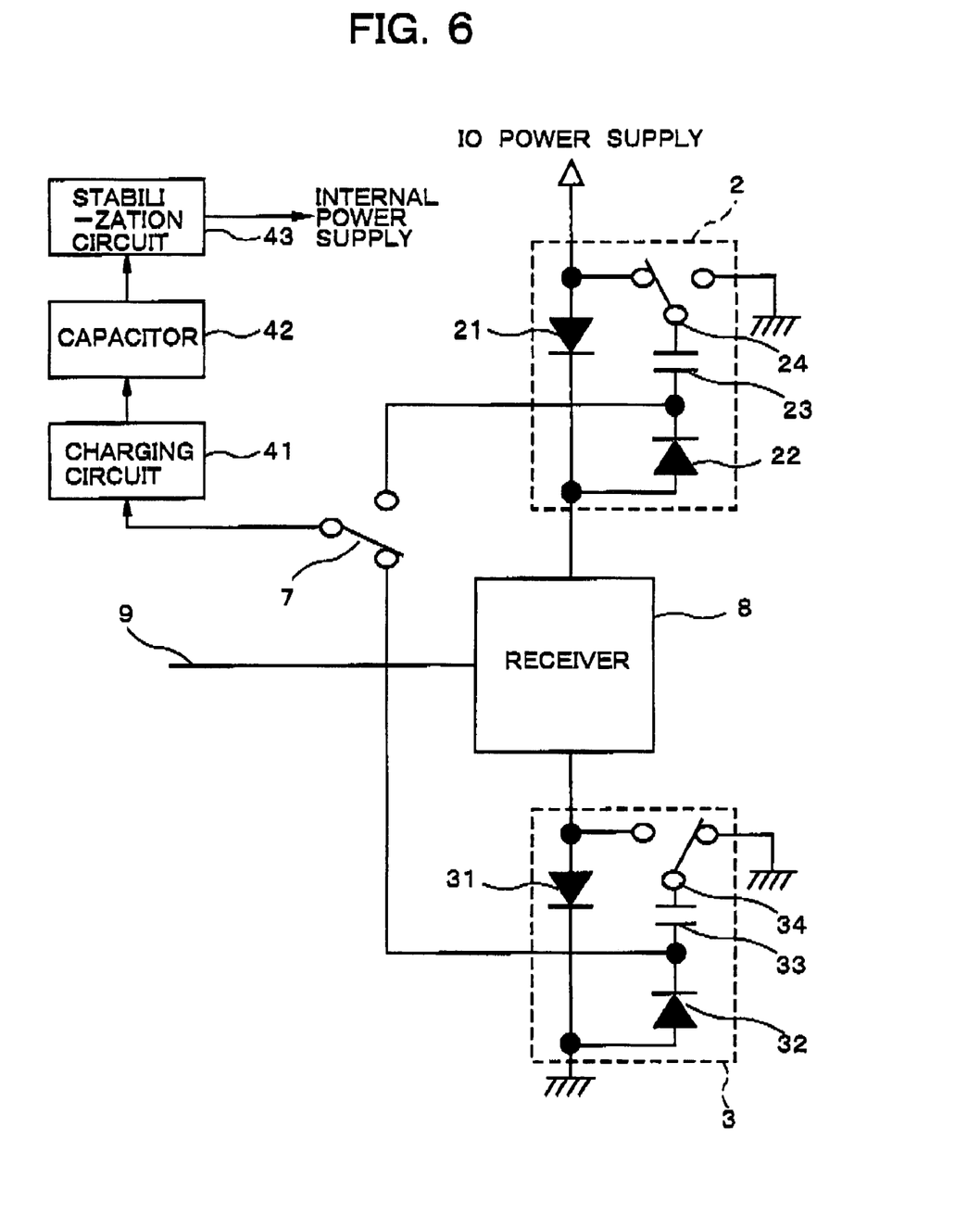
FIG. 6 is a circuit diagram showing the structure of a semiconductor device according to a fourth embodiment of the present invention.

Next, a fourth embodiment of the present invention will be described. FIG. 6 is a circuit diagram showing the structure of a semiconductor device according to a fourth embodiment. In FIG. 6, the buffer 1, which is the driver in FIG. 2, is replaced by a receiver 8, and an input signal 9 is input into this receiver 8. The remaining structure is the same as in FIG. 2. Accordingly, constituent elements that are the same as in FIG. 2 are labeled with the same symbols, and a detailed description of these elements is omitted. The operation of the present embodiment is also the same as the operation of the first embodiment, and the effects of the present embodiment are the same as those of the first embodiment.

The present invention is suitable for use in semiconductor devices built into information devices, communications devices, video devices, and other devices having numerous signal lines and requiring the high-speed transmission of signals.

What is claimed is:
1. A semiconductor device, comprising:
an output terminal;
an output buffer for outputting a signal via said output terminal;
a power supply for supplying a voltage to, and operating, an electronic circuit that includes said output buffer;
a first circuit which is connected to said output buffer and in which an overshoot whose output voltage exceeds the power supply voltage during the transition of the output signal level is recovered as energy and charged;
a second circuit which is connected to said output buffer and in which an undershoot whose output voltage falls below the ground voltage during the transition of the output signal level is recovered as energy and charged;
a charging circuit which is connected to said first or second circuit and which collects the charge charged by the first or second circuit;
a switch for switching the connection between said first and second circuit and said charging circuit;
a capacitor which is connected to said charging circuit and which stores the charge collected by the charging circuit; and
a supply circuit which is connected to said capacitor and which converts the charge stored in the capacitor into a power supply voltage of an internal power supply, and supplies the power supply voltage as an internal power supply.

2. The semiconductor device according to claim 1, wherein said switch comprises a field effect transistor.

3. The semiconductor device according to claim 1, wherein said first and second circuits have snubber circuits constructed by connecting a diode and a capacitor in series.

4. The semiconductor device according to claim 1, wherein said first circuit has:
- a first diode whose cathode side is connected to said input or output buffer and whose anode side is connected to said power supply;
- a second diode which is connected to the connection point between the first diode and said input or output buffer and whose anode side is connected to this connection point;
- a first capacitor which is connected to the second diode; and
- a first switch for switching the first capacitor to the ground point or the connection point between said power supply and said first diode;
- the connection point between said second diode and said first capacitor is connected to said charging circuit via said switch;

said second circuit has:
- a third diode whose anode side is connected to said input or output buffer and whose cathode side is connected to the ground point;
- a fourth diode which is connected to the connection point between the third diode and said ground point, and whose anode side is connected to this connection point;
- a second capacitor which is connected to the fourth diode; and
- a second switch for switching the second capacitor to the ground point or the connection point between said input or output buffer and said third diode; and
- the connection point between said fourth diode and said second capacitor is connected to said charging circuit via said switch.

5. The semiconductor device according to claim 4, wherein said first and second switches comprise field effect transistors.

6. A semiconductor device, comprising;
an input terminal;
an input buffer for inputting a signal said the input terminal;
a power supply for supplying a voltage to, and operating, an electronic circuit that includes said input buffer;
a first circuit which is connected to said input buffer and in which an overshoot whose input voltage exceeds the power supply voltage during the transition of the input signal level is recovered as energy and charged;
a second circuit which is connected to said input buffer and in which an undershoot whose input voltage falls below the ground voltage during the transition of the input signal level is recovered as energy and charged;
a charging circuit which is connected to said first or second circuit and which collects the charge charged by the first or second circuit;
a switch for switching the connection between said first and second circuit and said charging circuit;
a capacitor which is connected to said charging circuit and which stores the charge collected by the charging circuit; and
a supply circuit which is connected to said capacitor and which converts the charge stored in the capacitor into a power supply voltage of an internal power supply, and supplies the voltage as an internal power supply.

7. The semiconductor device according to claim 6, wherein said switch comprises a field effect transistor.

8. The semiconductor device according to claim 6, wherein said first and second circuits have snubber circuits constructed by connecting a diode and a capacitor in series.

9. The semiconductor device according to claim 6, wherein said first circuit has:
- a first diode whose cathode side is connected to said input or output buffer and whose anode side is connected to said power supply;
- a second diode which is connected to the connection point between the first diode and said input or output buffer and whose anode side is connected to this connection point;
- a first capacitor which is connected to the second diode; and
- a first switch for switching the first capacitor to the ground point or the connection point between said power supply and said first diode;
- the connection point between said second diode and said first capacitor is connected to said charging circuit via said switch;

said second circuit has:
- a third diode whose anode side is connected to said input or output buffer and whose cathode side is connected to the ground point;
- a fourth diode which is connected to the connection point between the third diode and said ground point, and whose anode side is connected to this connection point;
- a second capacitor which is connected to the fourth diode; and
- a second switch for switching the second capacitor to the ground point or the connection point between said input or output buffer and said third diode; and
- the connection point between said fourth diode and said second capacitor is connected to said charging circuit via connected to said power supply;
- a second diode which is connected to the connection point between the first diode and said input or output buffer and whose anode side is connected to this connection point;
- a first capacitor which is connected to the second diode; and
- a first switch for switching the first capacitor to the ground point or the connection point between said power supply and said first diode;
- the connection point between said second diode and said first capacitor is connected to said charging circuit via said switch;

said second circuit has:
- a third diode whose anode side is connected to said input or output buffer and whose cathode side is connected to the ground point;
- a fourth diode which is connected to the connection point between the third diode and said ground point, and whose anode side is connected to this connection point;
- a second capacitor which is connected to the fourth diode; and
- a second switch for switching the second capacitor to the ground point or the connection point between said input or output buffer and said third diode; and the connection point between said fourth diode and said second capacitor is connected to said charging circuit via said switch.

10. The semiconductor device according to claim 9, wherein said first and second switches comprise field effect transistors.

11. A semiconductor device, comprising:
an output terminal;
an output buffer for outputting a signal via said output terminal;
a power supply for supplying a voltage to, and operating, an electronic circuit that includes said output buffer;
a first circuit which is connected to said output buffer and in which an overshoot whose output voltage exceeds the power supply voltage during the transition of the output signal level is recovered as energy and charged;
a second circuit which is connected to said output buffer and in which an undershoot whose output voltage falls below the ground voltage during the transition of the output signal level is recovered as energy and charged;
charging circuits which are separately connected to said first and second circuits, and which collect the charge charged by the first and second circuits;
capacitors which are connected in a corresponding manner to said charging circuits and which store the charge collected by the charging circuits; and
supply circuits which are separately connected to said capacitors and which convert the charge stored in the capacitors into a power supply voltage of an internal power supply, and supply the voltage as an internal power supply.

12. The semiconductor device according to claim 11, wherein said first and second circuits have snubber circuits constructed by connecting a diode and a capacitor in series.

13. The semiconductor device according to claim 11, wherein
said first circuit has:
a first diode whose cathode side is connected to said input or output buffer and whose anode side is connected to said power supply;
a second diode which is connected to the connection point between the first diode and said input or output buffer and whose anode side is connected to this connection point; and
a first capacitor, one end of which is connected to the second diode, and the other end of which is grounded;
the connection point between said second diode and said first capacitor is connected to said charging circuit;
said second circuit has:
a third diode whose anode side is connected to said input or output buffer and whose cathode side is connected to the ground point;
a fourth diode which is connected to the connection point between the third diode and said ground point, and whose anode side is connected to this connection point; and
a second capacitor, one end of which is connected to the fourth diode, and the other end of which is grounded; and
the connection point between said fourth diode and said second capacitor is connected to said charging circuit.

14. A semiconductor device, comprising:
an input terminal;
an input buffer for inputting a signal via said input terminal;
a power supply for supplying a voltage to, and operating, an electronic circuit that includes said input buffer;
a first circuit which is connected to said input buffer and in which an overshoot whose input voltage exceeds the power supply voltage during the transition of the input signal level is recovered as energy and charged;
a second circuit which is connected to said input buffer and in which an undershoot whose input, voltage falls below the ground voltage during the transition of the input signal level is recovered as energy and charged;
charging circuits which are separately connected to said first and second circuits, and which collect the charge charged by the first and second circuits;
capacitors which are connected in a corresponding manner to said charging circuits and which store the charge collected by the charging circuits; and
supply circuits which are separately connected to said capacitors and which convert the charge stored in the capacitors into a power supply voltage of an internal power supply, and supply the voltage as an internal power supply.

15. The semiconductor device according to claim 14, wherein said first and second circuits have snubber circuits constructed by connecting a diode and a capacitor in series.

16. The semiconductor device according to claim 14, wherein
said first circuit has:
a first diode whose cathode side is connected to said input or output buffer and whose anode side is connected to said power supply;
a second diode which is connected to the connection point between the first diode and said input or output buffer and whose anode side is connected to this connection point; and
a first capacitor, one end of which is connected to the second diode, and the other end of which is grounded;
the connection point between said second diode and said first capacitor is connected to said charging circuit;
said second circuit has:
a third diode whose anode side is connected to said input or output buffer and whose cathode side is connected to the ground point;
a fourth diode which is connected to the connection point between the third diode and said ground point, and whose anode side is connected to this connection point; and
a second capacitor, one end of which is connected to the fourth diode, and the other end of which is grounded; and
the connection point between said fourth diode and said second capacitor is connected to said charging circuit.

* * * * *